US010698821B2

(12) United States Patent
Gottin et al.

(10) Patent No.: US 10,698,821 B2
(45) Date of Patent: Jun. 30, 2020

(54) IN-MEMORY DATAFLOW EXECUTION WITH DYNAMIC PLACEMENT OF CACHE OPERATIONS AND ACTION EXECUTION ORDERING

(71) Applicant: EMC IP Holding Company LLC, Hopkinton, MA (US)

(72) Inventors: Vinícius Michel Gottin, Rio de Janeiro (BR); Fábio André Machado Porto, Petropolis (BR); Yania Molina Souto, Petropolis (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/174,448

(22) Filed: Oct. 30, 2018

(65) Prior Publication Data

US 2020/0133859 A1    Apr. 30, 2020

(51) Int. Cl.
*G06F 12/00* (2006.01)
*G06F 12/0806* (2016.01)
*G06F 17/10* (2006.01)

(52) U.S. Cl.
CPC .......... *G06F 12/0806* (2013.01); *G06F 17/10* (2013.01); *G06F 2212/1041* (2013.01); *G06F 2212/608* (2013.01)

(58) Field of Classification Search
CPC ................ G06F 12/0806; G06F 17/10; G06F 2212/608; G06F 2212/1041
See application file for complete search history.

(56) References Cited

U.S. PATENT DOCUMENTS

| 2008/0195577 A1* | 8/2008 | Fan ................... G06F 16/24545 |
| 2013/0346988 A1* | 12/2013 | Bruno ................... G06F 9/5066 718/102 |
| 2014/0089559 A1* | 3/2014 | Cai ....................... G06F 12/126 711/102 |

OTHER PUBLICATIONS

U.S. Appl. No. 151662,704 entitled, "Automatic Placement of Cache Operations for Complex In-Memory Dataflows", filed Jul. 28, 2017.

(Continued)

*Primary Examiner* — Arvind Talukdar
(74) *Attorney, Agent, or Firm* — Ryan, Mason & Lewis, LLP

(57) ABSTRACT

A dataflow execution environment is provided with dynamic placement of cache operations and action execution ordering. An exemplary method comprises: obtaining a current cache placement plan for a dataflow comprised of multiple operations and a corresponding current cache gain estimate; selecting an action to execute from a plurality of remaining dataflow actions based on a predefined policy; executing one or more operations in a lineage of the selected action and estimating an error as a difference in an observed execution time and an estimated execution time given by a cost model; obtaining an alternative cache placement plan for the dataflow following the execution in conjunction with a predefined new plan determination criteria being satisfied and a corresponding alternative cache gain estimate; implementing the alternative cache placement plan in conjunction with a predefined new plan implementation criteria being satisfied; and selecting a next action to execute from a plurality of remaining actions in the dataflow based on a predefined policy.

20 Claims, 11 Drawing Sheets

(56) References Cited

OTHER PUBLICATIONS

U.S. Appl. No. 16/040,761 entitled, "In-Memory Dataflow Execution with Dynamic Placement of ache Operations", filed Jul. 20, 2018.
U.S. Appl. No. 16/040,774 entitled, "Dataflow Execution Time Estimation for In-Memory Distributed Processing Framework", filed Jul. 20, 2018.
Gottin et al., "Automatic Caching Decision for Scientific Dataflow Execution in Apache Spark," in BeyondMR'18 Workshop SIGMOD 2018, Houston, TX, USA, 2018.
Sparks et al., "KeystoneML: Optimizing pipelines for large-scale advanced analytics," in Data Engineering (ICDE), 2017 IEEE 33rd International Conference on, 2017.
Porto et al. "Constellation Queries over Big Data", CoRR. abs/1703.0, (2017).

\* cited by examiner

| S-CACHE Process |
|---|
| *ini*    the intial state denoting no applied caches |
| *beam*   an argument to limit the number of candidate states generated at each iteration |
| |
| S-CACHE(*ini*, *beam*): |
|    *best* ← *ini*, the best state so far |
|    *open* ← [ *ini* ], list of states to explore ordered by cache gain |
|    *closed* ← [ ], an empty list, the explored states |
|    while *open* is not empty: |
|      S ← take and remove the first state in *open* |
|      *closed* ← append S to *closed* |
|      if Cost(S) < Cost(*best*): |
|        *best* ← S |
|      end if |
|      *ops* ← list of o in O sorted by Cache-gain(o,S) |
|      *ops* ← first *beam* items of *ops* |
|      for o in *ops* such that Cache-gain(o,S)>0: |
|        S' ← S with o additionally cached |
|        if S' not in *closed*: |
|          *open* ← add S' to *open*, |
|                  sorted by lowest state cost |
|        end if |
|      end for |
|    end while |
|    return *best* |

FIG. 4

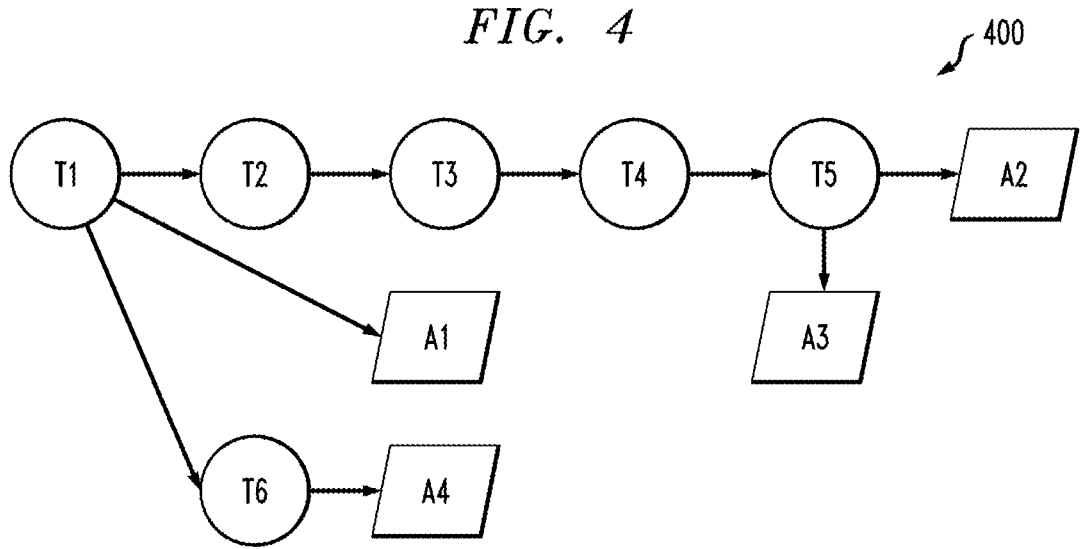

FIG. 5

DATAFLOW OPERATIONS TABLE

| | OPERATION | | DESCRIPTION |
|---|---|---|---|
| TRANSFORMATIONS | T1 | QUADTREE | BUILDS A QUADTREE (QT) FROM DATA IN THE INPUT FILE. |
| | T2 | FIND NEIGHBORS | FOR EACH STAR FINDS ITS NEIGHBORS USING THE QT BUILT IN T1. |
| | T3 | COMP. MATCHING PAIRS | FOR EACH PAIR (STAR, NEIGHBOR) EVALUATES A MATCHING CRITERION. |
| | T4 | JOIN | JOINS BUCKETS RESULTING FROM THE MATCHING. |
| | T5 | FILTER | FILTERS OUT MATCHED TUPLES. |
| | T6 | COMPUTE QUALITY | FOR EACH QT LEAF NODE CHECKS SOME QUALITY MEASURE. |
| ACTIONS | A1 | COUNT | RETURNS THE NUMBER OF LEAF NODES IN QT. |
| | A2 | COLLECT | OBTAINS THE RESULTS OF FT. |
| | A3 | COUNT | RETURNS THE NUMBER OF ROWS IN THE RESULT. |
| | A4 | COLLECT | OBTAINS THE RESULTS OF THE QUALITY MEASURE. |

FIG. 6

OPERATIONS PROPERTIES ~600

| OPERATION | TYPE | PRIOR | FOLLOWING | ACCUM. COST | WRITE CACHE COST | READ CACHE COST |
|---|---|---|---|---|---|---|
| T1 | TRANSFORMATION | – | T2, A1 | 39.30 | 80 | 16 |
| T2 | TRANSFORMATION | T1 | T3 | 334.75 | 9 | 1.8 |
| T3 | TRANSFORMATION | T2 | T4 | 0.069 | 6 | 1.2 |
| T4 | TRANSFORMATION | T3 | T5 | 0.13 | 1 | 0.2 |
| T5 | TRANSFORMATION | T4 | A2, A3 | 0.10 | 0.5 | 0.1 |
| T6 | TRANSFORMATION | T1 | A4 | 2.47 | 1.5 | 0.3 |
| A1 | ACTION | T1 | – | 4 | – | – |
| A2 | ACTION | T5 | – | 2 | – | – |
| A3 | ACTION | T5 | – | 2 | – | – |
| A4 | ACTION | T6 | – | 12 | – | – |

FIG. 9

Online Cache Placement Dataflow Execution Process with Action Ordering Evaluation (OAEX-CACHE)

```
Inputs a dataflow w, a model for the transformation costs and cache costs m,
        the infrastructure i and dataset d;
        threshold minimum error in the cost model, for each evaluation unit,
        that triggers re-application of a cache plan
OEX-CACHE (w, m, i, d, threshold):
best_cache, best_gain ← S-CACHE(w, m, i, d)
w ← apply best_cache to w
A ← list of actions in w
next_a ← select action in A by policy
while next_a is not nil:
        L ← lineage of next_a
        for o in L:
                Trace ← EXECUTE(o,i,d)
                error ← (cost of o in Trace - cost of o in m)
                if error > threshold of o in m given i and d:
                        m ← UPDATE_MODEL(m, Trace)
                        i ← EVAL_INFRASTRUCTURE(i, Trace)
                        d ← PROVENANCE_DATASETS(w, d, Trace)
                        alternative_cache, alternative_gain ← S-CACHE(w, i, d)
                        if alternative_cache = best_cache:
                                threshold ← UPDATE_THRESHOLD(threshold, error, m, i, d)
                        else:
                                change_cost = ESTIMATE(best_cache, alternative_cache)
                                if change_cost < (alternative_gain - best_gain):
                                        w ← apply alternative_cache to w
                                        best_gain ← alternative_gain
                                end if
                        end if
                end if
        end for
        w ← remove references of L from w
        if there are cached operations in w with zero references:
                best_cache, best_gain ← S-CACHE(w, m, i, d)
                w ← apply best_cache to w
        end if
        A ← remove a from A
        next_a ← select action in A by policy, nil if A is empty
end while
return
```

IN-MEMORY DATAFLOW EXECUTION WITH DYNAMIC PLACEMENT OF CACHE OPERATIONS AND ACTION EXECUTION ORDERING

FIELD

The field relates generally to caching techniques for a dataflow execution environment.

BACKGROUND

In some dataflows, a given action can have multiple executions during the dataflow, with various dependent transformations. To improve the performance of such dataflows, some dataflow engines provide mechanisms to persist the output of a transformation using a caching operation, thereby avoiding the re-execution of precedent operations. The caching operation indicates that the dataset produced by an operation should be kept in memory for future reuse, without the need for re-computation.

The use of a caching operation potentially avoids the increased cost incurred by multiple actions in a dataflow. In the case of real-time dataflow executions, however, identifying the datasets to cache as the dataflow progresses is not trivial.

A need therefore exists for techniques for dynamic placement of cache operations during the execution of such dataflows.

SUMMARY

Illustrative embodiments of the present disclosure provide for dataflow execution with dynamic placement of cache operations and action execution ordering. In one embodiment, an exemplary method comprises: obtaining a cost model for the execution of operations of a dataflow in a parallel processing framework with a given infrastructure and input dataset; obtaining a current cache placement plan for the dataflow, wherein the current cache placement plan comprises a combination of output datasets of a subset of the operations in the dataflow to cache based on an estimated reduction in a total execution cost for the dataflow in conjunction with the current cache placement plan being implemented given an input dataset; obtaining a current cache gain estimate for the current cache placement plan; selecting an action to execute from a plurality of remaining actions in the dataflow based on a predefined policy; executing one or more operations in a lineage of the selected action of the dataflow and estimating an error as a difference in an observed execution time and an estimated execution time given by the cost model; determining an alternative cache placement plan for the dataflow following the execution in conjunction with a predefined new plan determination criteria being satisfied; obtaining an alternative cache gain estimate for the alternative cache placement plan; implementing the alternative cache placement plan in conjunction with a predefined new plan implementation criteria being satisfied; and selecting a next action to execute from a plurality of remaining actions in the dataflow based on a predefined policy.

In some embodiments, the new plan determination criteria comprises a difference between prior estimates of an execution time of the one or more executed operations obtained from the cost model and an actual execution time of the one or more executed operations exceeding a predefined error threshold and the predefined new plan implementation criteria comprises a difference between the alternative cache gain estimate and the current cache gain estimate exceeding a predefined threshold.

In at least one embodiment, the predefined policy selects the next action from the dataflow having a substantially least number of referenced cached operations and/or substantially minimizes the total execution cost of the dataflow considering future changes in the current cache placement plan.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for an S-CACHE process, according to an embodiment;

FIGS. 4-8, collectively, provide an example based on a Constellation Query dataflow to illustrate a context of the present disclosure;

FIG. 9 illustrates exemplary pseudo code for an online cache placement dataflow execution process with action execution ordering, according to one embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dataflow execution with dynamic placement of cache operations and action execution ordering.

In one or more embodiments, an exemplary online cache placement dataflow execution process is provided with action execution ordering that uses a cache placement algorithm to make decisions dynamically, during execution of a dataflow. In some embodiments, the use of memory is substantially optimized by analyzing over time the data that should be removed from memory because it will not be needed anymore or if the data selected for caching remains a substantially best option as the operations are being executed. These types of decisions help improve the execution times, for example, in cases where memory is limited.

One or more aspects of the disclosure recognize that it is possible to capture real-time costs of the transformations, update the model and adjust the caching options, all while the dataflow operations are being executed. Further, revising the cost models, during an execution of the dataflow, based on actual observations enables the creation of a provenance database. Thus, for future executions of similar dataflows or operations, the cost models can rely on the updated cost models of previous applications of the disclosed dynamic cache placement techniques with action execution ordering.

Figure 1:
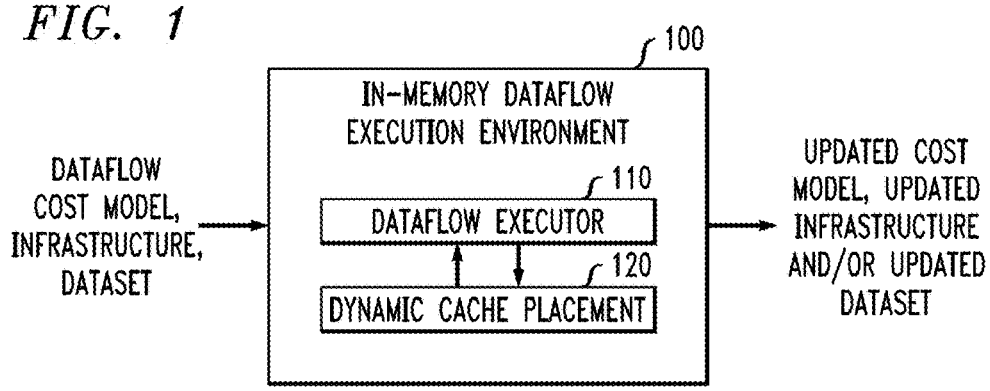
FIG. 1 illustrates an exemplary in-memory dataflow execution environment, according to one or more embodiments of the disclosure.

FIG. 1 illustrates an exemplary in-memory dataflow execution environment 100, according to one or more embodiments of the disclosure. As shown in FIG. 1, the exemplary in-memory dataflow execution environment 100 processes a given dataflow, a cost model, an infrastructure and a dataset as inputs.

The dataflow is executed by a dataflow executor 110. A dynamic cache placement module 120 monitors the execution of the dataflow by the dataflow executor 110 and dynamically updates the placement of cache operations during the dataflow execution, as discussed further below in conjunction with FIG. 9.

The exemplary in-memory dataflow execution environment 100 optionally generates an updated cost model, an updated infrastructure and/or an updated dataset as outputs.

Figure 2:
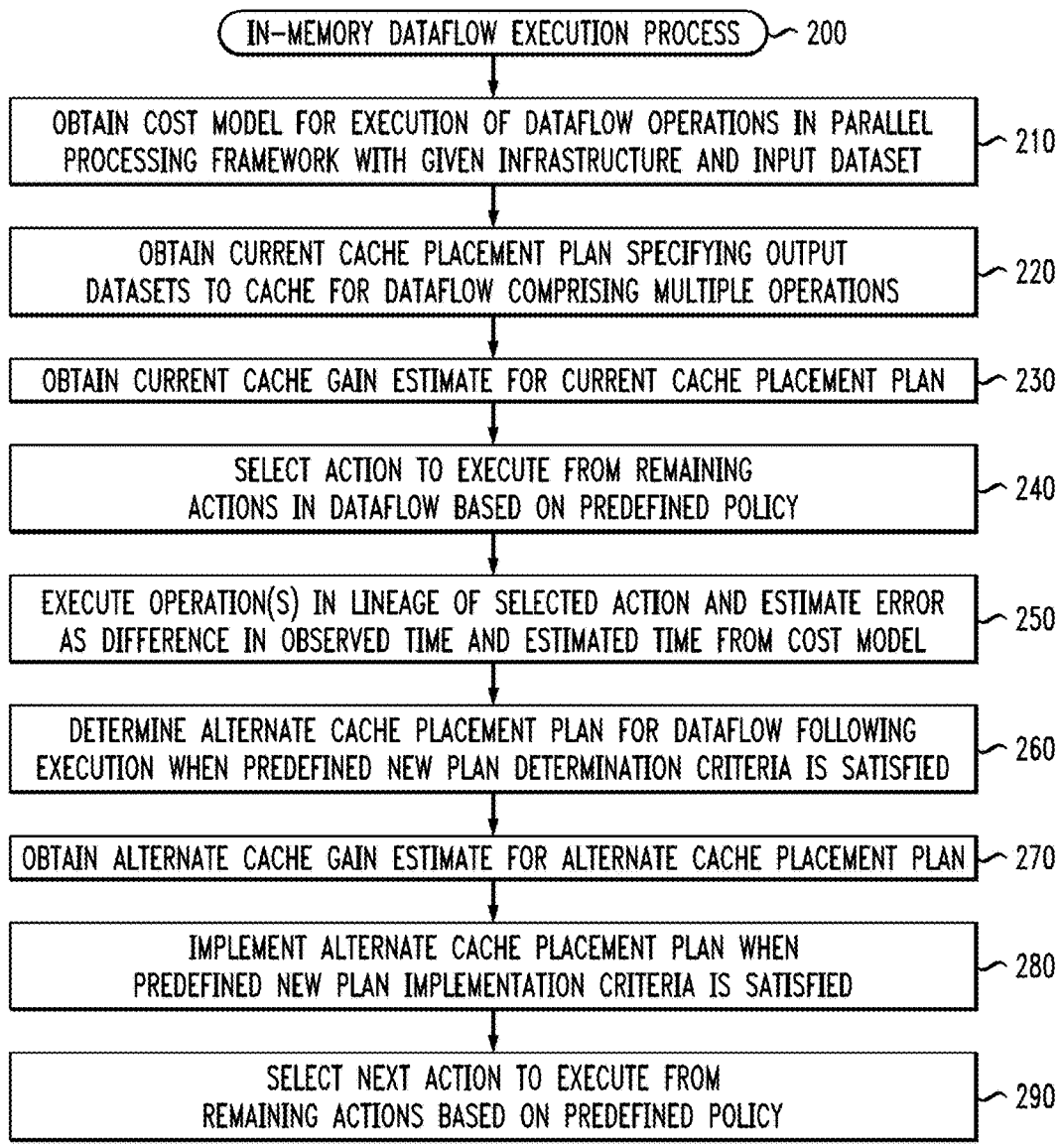
FIG. 2 is a flow chart illustrating an exemplary implementation of an in-memory dataflow execution process, according to one embodiment of the disclosure.

FIG. 2 is a flow chart illustrating an exemplary implementation of an in-memory dataflow execution process 200, according to one embodiment of the disclosure. As shown in FIG. 2, the exemplary in-memory dataflow execution process 200 initially obtains a cost model during step 210 for the execution of operations of a dataflow in a parallel processing framework with a given infrastructure and input dataset.

Thereafter, the exemplary in-memory dataflow execution process 200 obtains a current cache placement plan during step 220 for a dataflow comprised of a plurality of operations. Generally, the current cache placement plan comprises a combination of output datasets of a subset of the operations in the dataflow to cache based on an estimated reduction in a total execution cost for the dataflow when the current cache placement plan is implemented given an input dataset.

In addition, the exemplary in-memory dataflow execution process 200 obtains a current cache gain estimate during step 230 for the current cache placement plan. The cache gain estimate comprises an estimated reduction in the total execution cost for the dataflow when the cache placement plan is implemented.

During step 240, an action to execute is selected from a plurality of remaining actions in the dataflow based on a predefined policy. One or more operations in a lineage of the selected action of the dataflow are executed during step 250, and an error is estimated as a difference in an observed execution time and an estimated execution time given by the cost model.

An alternative cache placement plan is determined during step 260 for the dataflow following the execution when a predefined new plan determination criteria is satisfied (e.g., when a difference between prior estimates of an execution time of the executed operations obtained from the cost model and an actual execution time of the executed operations exceeds a predefined error threshold).

The exemplary in-memory dataflow execution process 200 obtains an alternative cache gain estimate for the alternative cache placement plan during step 270, and implements the alternative cache placement plan during step 280 when a predefined new plan implementation criteria is satisfied (e.g., when a difference between the alternative cache gain estimate and the current cache gain estimate exceeds a predefined threshold).

Finally, a next action to execute is selected during step 290 from a plurality of remaining actions in the dataflow based on the predefined policy.

Large-scale data processing frameworks, such as Spark and Flink, have been adopted in the industry and academia. These frameworks employ a programming model in which the user defines a dataflow of operations that specify transformations on the input data. These operations are often lazy (or late) evaluated, as they define a logical plan that is only actually enacted when an action operation is executed (e.g., an operation that requires returning the results of the defined computation to the coordinating process (referred to as the driver program, in Spark)).

A side effect of the lazy execution model is that dataflows with more than one action incur multiple executions of their dependent transformations. This increases the cost of executing the dataflow substantially. To improve the performance of dataflows running under a lazy execution model, some dataflow engines provide mechanisms to persist the output of a transformation, avoiding the re-execution of precedent operations. This is called a caching operation. In this scenario, a user informs the system about the persistence strategy by altering the persistence mode of a dataset produced by an operation. The caching operation does not modify the lazy execution model, and merely indicates that the dataset produced by an operation should be kept in memory for future reuse, without the need for re-computation. Therefore, the use of a caching operation potentially avoids the increased cost incurred by multiple actions in a dataflow.

U.S. patent application Ser. No. 15/662,704, filed Jul. 28, 2017, (now U.S. Pat. No. 10,324,845), entitled "Automatic Placement of Cache Operations for Complex In-Memory Dataflows," incorporated by reference herein in its entirety, describes an approach for the automatic placement of cache operations in complex dataflows that substantially optimizes the execution cost. A formal model is provided for the representation of the dataflow, in some embodiments, which lends itself to the description of disclosed methods for the estimation of the number of executions and costs of operations and the automatic search for the best cache placement strategy. U.S. patent application Ser. No. 15/662,704, in one or more embodiments, describes a static strategy that computes a substantially best cache placement based on a cost model that uses estimates on dataset size and transformation cost, in addition to a view of the workflow.

U.S. patent application Ser. No. 16/040,761, filed Jul. 20, 2018, entitled "In-Memory Dataflow Execution with Dynamic Placement of Cache Operations," incorporated by reference herein, leverages the techniques of U.S. patent application Ser. No. 15/662,704 to revise the cache placement strategy in a dynamic fashion. A dynamic execution algorithm is provided that dynamically revises the optimal cache placement, for example, after each action as an evaluation unit. In the present context, the term dynamic refers to the fact that the approach changes the cache placement plan after the dataflow has been submitted for execution, potentially multiple times.

In some embodiments, an online approach is provided for the revision of the cache placement strategy. The disclosed online revision enables a globally optimal choice in at least one embodiment for the ordering in the executions of actions of the dataflow.

One or more aspects of the present disclosure recognize that as operations are executed, the optimal cache strategy may change due to changes in the environment. For example, changes in infrastructure or faults in computational nodes may cause variations in execution times and overheads. Furthermore, a lack of provenance information, memory limitations and errors in dataset size estimates, especially after transformations have been applied to the dataset, can all impact the execution time of dataflow operations and jeopardize a statically planned data caching. In this context, a dynamic cache placement approach becomes increasingly relevant. However, especially in long dataflows, postponing change in the cache placement strategy until after the next action is executed may be suboptimal. In order to revise the cache placement as soon as possible, an online approach is needed.

In typical distributed processing frameworks, the definition of the dataflow implicitly defines a directed acyclic graph (DAG) of operations terminating in actions, in which nodes represent transformations or actions (i.e., operations) and directed edges model the producer-consumer relationship between operations. The DAG defined therein specifies a partial ordering among operations in the graph. However, in the cache placement problem, it becomes important to discard cached outputs of operations that are no longer required, freeing resources for computation of further cache placements. In this sense, controlling the total ordering of the evaluations of actions (that trigger the executions of operations in the lineage of those actions) can severely impact the efficiency of the dataflow execution.

As recognized in U.S. patent application Ser. No. 15/662,704, large-scale data processing frameworks are currently widely adopted in the industry and academia. These frameworks employ a programming model in which the user defines a dataflow of operations on the input data. In the present disclosure, such frameworks are considered in some embodiments with the particular execution strategy of lazy evaluation, such as Apache Spark. This programming paradigm is more attractive than executing an operation at the same time, which can delay the process. Lazy evaluation assumes that substantially all transformations can be combined in a single transformation and executed together; it is only necessary to activate an action over them. Through this DAG, Spark maintains the record of every operation performed. That keeps track of each step through its arrangement of vertices and edges. Therefore, when any action is invoked, the DAG returns to the list of operations that will be triggered.

Although the lazy evaluation strategy offers many benefits, a side effect is that any transformation in the dataflow may be executed multiple times, as multiple references in the dataflow lineage of each action to the transformation output may exist. As the intermediate results of executing an action are not automatically persisted, this occurs whenever a transformation is in the dependency path of more than one action. Caching the appropriate datasets may avoid the re-execution of several transformations in the dependency path of the dataflow actions. Consider the following intuitive metrics, typically considered by users when deciding the placement of explicit caching operations:

(i) the number of references to each transformation in the dataflow;

(ii) the distance between transformations and actions;

(iii) the number of transformations in the dataflow that need to be executed prior to each transformation;

(iv) the associated cost of transformations; and (v) the cost to access (read and write) a cached dataset.

Thus, deciding which datasets to cache is a non-trivial problem. This is highlighted by the fact that focusing on a single metric may frequently lead to undesired negative results. In complex dataflows, even selecting which of these metrics would be the most appropriate to be taken into account would require the programmer to have a deep knowledge about the dataflows, the cost of operations and even the infrastructure being considered for the dataflow execution.

Automatic Cache Placement

In one or more embodiments, the dataflow is represented as a DAG G, in which the nodes (vertices) are the operations, and the edges represent the data dependencies between them. Typically, the dataflow defined by the programmer implicitly defines such a graph, and syntactical analysis of a program suffices to derive it unambiguously. If this is not the case, the programmer may otherwise explicitly define the structure of the graph conforming to the formalization below.

Formally, a graph G is defined as a tuple G=(O, E), $O=\{o_1, o_2, \ldots, o_n\}$ is a set of nodes, and $E=\{e_1, e_2, \ldots, e_m\}$ is a set of directed edges $e:(o_i \rightarrow o_j)$, with $o_i, o_j \in O$. Each such edge states that operation $o_j$ depends on operation $o_i$, meaning that the datasets generated by $o_i$ are required for the execution of $o_j$.

$P^o=\{p|e:(p \rightarrow o) \in E\}$ is defined as the set of operations that precede operation o. This denotes that o requires the output of all operations in $P^o$, which must be executed before it. Conversely, $F^o=\{f|e:(o \rightarrow f) \in E\}$ is the set of operations that directly follow o. All the operations in $F^o$ require o's output, and thus o must be executed after them. Consider in this formulation that the results of action operations configure the outputs of the dataflow itself, which are not required for further transformations, and thus for any action operation o, $F^o$ is the empty set.

Consider the following cache-independent properties of the dataflow. These are properties that do not change as cache operations are defined. Recall that operations are known to be either transformations or actions a priori. Each operation o in the dataflow is defined in some embodiments to have a type property, denoted o.type, indicating whether it is a transformation or an action.

In order to reference the dependence relations among operations in the dataflow, these relations are represented as properties of the operations. Recall $P^o$ and $F^o$ as the sets of operations directly preceding and following operation o. These configure the precede (or prior operation) and follow properties of o, denoted o.pre and o.fol, respectively.

Consider the static properties that configure the cost model for the operations. They are the individual cost (o.ind), the cache write cost (o.wcache), and the cache read cost (o.rcache), respectively, abstractions of the computational times associated with the operation.

The individual cost is the cost of executing a transformation or action operation in a specified context. Notice that the context defines the size and features of the input dataset, and thus the estimate of the individual cost of an operation that consumes this dataset can be obtained by predictive models. The estimate of the individual costs of operations, at intermediate positions in the dataflow, further rely on predictive models of the outputs of their preceding operations.

The cache write cost denotes the computational cost to persist the output dataset of the transformation (e.g., to "cache that transformation"). Like the individual cost, the estimate of this cost relies on the prediction of the output of the operation—particularly, its size.

The cache read cost represents the cost of accessing a cached dataset resulting from the operation. The same observations as in the case of the cache write cost hold.

Next, consider certain cache-dependent properties of the operations that, therefore, depend on the current state, including the cache gain computation. The state dataflow cost is the total cost to execute the dataflow in a given state, in relation to the previous definitions. Finally, the search algorithm S-CACHE which leverages the cache gain estimate as a heuristic for guiding the search, as discussed further below in conjunction with FIG. 3.

As the exemplary S-CACHE algorithm comprises a search, consider the state structure. Each such state represents a cache decision, i.e., a certain placement of zero or more cache operations on the dataflow. Recall, however, that the disclosed algorithm executes before the dataflow execution, and that the state corresponds to an intermediate result of the search algorithm is a search state, and not an actual dataflow execution state. The alternative combinations of cache placements in a dataflow are referred to as alternative caching states. The state structure comprises an annotation, for each operation in the dataflow, of whether that operation is to be cached or not.

For the remainder of the discussion, assume the term is-cached(o,S) denotes the Boolean value of this annotation for operation o in state S. Refer to the state ini in which no operations are cached to be the initial search state, such that is-cached(o,ini) is false for all o∈O.

As discussed hereinafter, certain cache-dependent properties of the operations are calculated given a state. These are used to define the computation of the total dataflow cost in a state (the state cost) and the cache-gain heuristic that guides the search algorithm.

The accumulated cost of a certain operation is referred to as the cost of executing that operation plus all its requirements. This value depends on the state, as the cost of the requirements depends on whether preceding operations have to be executed or if their results are already cached.

Formally, the accumulated cost of operation o is the cost of executing o itself plus a cost factor of each operation p that precedes it, p∈o.pre. If p is cached that factor is the cost of reading the cached data generated from p, p.rcache. However, if p is an un-cached operation, o considers the accumulated cost of p as that factor. In this recursive definition, the base cases are the source operations of the dataflow, with no preceding operations. Thus, the accumulated cost of o in S is calculated as follows, in some embodiments:

$$Acc(o, S) = o.ind + \sum_{p \in o.pre} \begin{cases} p.rcache & \text{if is-cached}(p, S) \\ Acc(p, S), & \text{otherwise} \end{cases}.$$

Consider the case, in the present example, when no operations are cached (the ini state). The accumulated cost of T1 in this initial state ini is its individual cost, as it has no preceding operations, and thus Acc(T1,ini)=39.30. The accumulated cost of A1 in ini is its own individual cost (=4) plus the individual cost of T1, which precedes it, and so Acc(A1,ini)=43.30.

Assume a state S1 in which T1 is cached. In that case, the accumulated cost of A1 instead takes into account the cost of accessing the cached data of T1 (=16), instead of the cost of executing T1. Thus, Acc(A1,S1)=20.

Also consider the number of executions of each operation in a given state. The number of executions of an operation is a useful property for reasoning about the impact of caching that operation in the costs of the other operations in the dataflow. When no operations are cached, the number of executions of an operation corresponds to the number of references to that operation (the number of lineages of actions in which the operation appears). However, when the operation is cached, it is executed only once, as future references to it reuse the cached results instead of triggering re-executions. This, in turn, affects the number of executions of the operations that precede it. The number of executions of operation o in state S is recursively defined, as follows:

$$Execs(o, S) = \begin{cases} 1 & \text{if } o.type \text{ is action or is-cached}(o, S), \\ \sum_{f \in o.fol} Execs(f, S), & \text{otherwise} \end{cases}$$

In the present example, with no operations cached, $T1^{ini}$.execs=4. If T1 is cached, however, $T1^{S1}$.execs=1.

Finally, the cache gain property of an operation o in state S is an estimate of the costs spared by additionally caching that operation from that state, stated as follows:

Cache-gain(o,S)=((Execs(o,S)−1)×Acc(o,S))−o.wcache.

This calculation takes into account the spared cost of caching the operation and the cost of the caching operation itself. The spared cost is the number of executions of the operation that would be spared with the caching (all but one, Execs(o, S)−1) multiplied by its accumulated cost Acc(o, S). The cost of the caching operation, o.wcache is subtracted from the spared cost to yield the cache gain estimate of o in S.

The cache gain estimate does not consider the impact of the cache read costs of the following operations, which is taken into account in the computation of the accumulated cost. The simplicity of the cache gain estimate is important, in some embodiments, as it must be calculated many times in the search procedure. The possibility of quickly estimating the cache gain provides a heuristic to guide the generation of states in the search, allowing an approach based on a generate-and-test re-computation of the operation properties to be avoided. This motivates the use of the cache gain as a straightforward heuristic in the automatic search for the best combination of cache placements.

As an evaluation of the dataflow in a given state, the cost of the state is defined in some embodiments as follows. The cost of the state intuitively represents an expectation of the total execution cost of the dataflow when the set of caches that the state represents are defined, as follows:

$$Cost(S) = \sum_{o \in O} \begin{cases} Acc(o, S) & \text{if } o.type \text{ is action,} \\ o.wcache & \text{if is-cached}(o, S). \\ 0, & \text{otherwise} \end{cases}$$

Recall that the state ini in which no operations are cached is referred to as the initial state of the dataflow. This initial state configures the starting point for the search for the best cache decision.

Notice that in the calculation of the dataflow cost in a state, the only contributing factors, in one or more embodiments, are the accumulated costs of the actions and the cache write costs of operations. This follows from the definition of the accumulated cost, which already includes the costs of (repeated) executions of the transformations that are required by the actions, as well as the costs of (repeated) access to the cached data by cached transformations. The cache write cost is considered at most once for each transformation—transformations cannot be cached multiple times.

FIG. 3 illustrates exemplary pseudo code for an S-CACHE process 300, according to an embodiment of the disclosure. Generally, the exemplary S-CACHE process 300 performs a search over a large number (potentially all) of possible states. If no limits are imposed in the S-CACHE process 300, it performs a search over the entire state-space, keeping in memory at any given time the state with the lowest estimate cost. Due to the completeness, S-CACHE process 300 is substantially guaranteed to find the state with the substantially lowest cost as yielded by the cost model. However, the number of possible states grows exponentially regarding the size of the dataflow. Recall that one goal is to assign a value to the Boolean property is-cached to each transformation. The number of possible states in a dataflow with n transformations is thus $2^n$.

As shown in FIG. 3, the exemplary S-CACHE process 300 receives as argument the initial state ini in which, for all operations o, o.is-cached is false. The S-CACHE process 300 also receives as argument the beam limit that prunes the search space. Notice state memory restrictions are not explicitly stated in the formulation below, as the cost model definition does not include predictions for the memory footprint of the datasets generated by operations. With such a model at hand, the exemplary S-CACHE process 300 can be expanded to halt the generation of states upon reaching the limit of the memory dedicated for caching, in a similar manner as KeystoneML.

As shown in FIG. 3, the exemplary S-CACHE process 300 iteratively generates new candidate states in a list of open states, adding them to the closed states list, used to avoid expanding states twice, as they are explored. The best state (e.g., the one with the substantially lowest cost), is kept at all times. Each explored state is removed from the open list and compared to the best, taking its place if it has the lowest cost. The resulting best state at the end of the iteration is returned as the solution.

For each explored state, new states are generated, each caching an additional operation. All operations are sorted by the cache gain estimate, and only a maximum of the beam operations ops yield new states. These are added to the open list to be explored in order of substantially lowest cost. In this way, the explored state is substantially always the one with the substantially lowest cost so far, and if at any time the search procedure is interrupted, best is substantially guaranteed to be the substantially best state explored so far.

In the present description, the generation of new states is abstracted. In practice, the generation of a new state S' from S by additionally caching operation o requires the re-computation of the cache-dependent properties. In practice, computing these properties of the operations in S' from scratch is avoided by copying the data structure of S and recursively propagating changes to the accumulated costs (and the number of executions) of the operations that precede (or follow) the additionally cached operation o. Still, this configures the most expensive part of the algorithm, which reinforces the importance of using the (cheaper) cache gain as means of estimating (and limiting the number of) the operations to cache.

Notice also that per the definition of the cache gain estimate, actions and operations already cached in S have a cache gain of zero. Hence, they are excluded from generating new candidates. This avoids having the algorithm consider states where the same operation is cached twice.

The result of the exemplary S-CACHE process 300 is a cache plan, to be applied to the dataflow before its execution. If the cost model estimates are wrong by a significant margin (e.g., due to changes in the infrastructure or wrong estimates over the computation times or dataset features), the cache plan dictated by the exemplary S-CACHE process 300 may become suboptimal or even detrimental. To this end, in the following disclosure, a novel computational approach is provided to automatically revise, in a dynamic fashion, the cache placement strategy for the efficient execution of a given complex dataflow.

Motivating Example

A motivating example is provided that illustrates the dynamic cache placement problem. The following example corresponds to an astronomy workflow defined using the Apache Spark framework. See, e.g., F. e. a. Porto, "Constellation Queries Over Big Data," *CoRR abs*/1703.0 (2017). The Constellation Query dataflow searches astronomy catalogs looking for geometric patterns. Its Spark implementation can be mapped to other in-memory dataflow frameworks.

FIG. 4 illustrates an exemplary Constellation Query dataflow 400, comprised of six transformations (T1 to T6) triggered by four actions (A1 to A4). The directed edges in the dataflow 400 represent the dependencies between the datasets produced/consumed by the operations. For example, the dataset produced by transformation T1 is consumed by transformations T2 and T6 and by the action A1, while the dataset produced by transformation T5 is consumed by actions A2 and A3.

FIG. 5 illustrates an exemplary dataflow operations table 500, describing details of the operations of dataflow 400 of FIG. 4. The seemingly promising candidate caches, in dataflow 400, are transformations T1, T2, T3, T4 and T5, since these are referenced by more than one action in the dataflow (transformation T6 is not considered in the discussion below, as it is not re-used).

In some embodiments, the selection of one or more of these transformations to be cached will depend on the cost of their execution, the size of the output dataset and its proximity to the action, since they all share the same number of references. The order of execution of the actions coincides with the sub-index assigned in FIG. 4. Under these conditions, the cache strategy is selected with an input dataset of 1 GB, and the S-CACHE process 300 of FIG. 3 is initialized as an instantiation of U.S. patent application Ser. No. 15/662,704. The exemplary S-CACHE process 300 is initialized with the DAG of execution of the workflow and the costs of the transformations and actions extracted from a provenance model, as well as the cost of reading and writing in cache of an output dataset.

FIG. 6 illustrates an exemplary operations properties table 600 that summarizes the costs extracted from the provenance model for the exemplary dataflow 400 of FIG. 4, using the abbreviations introduced above.

Figure 7:
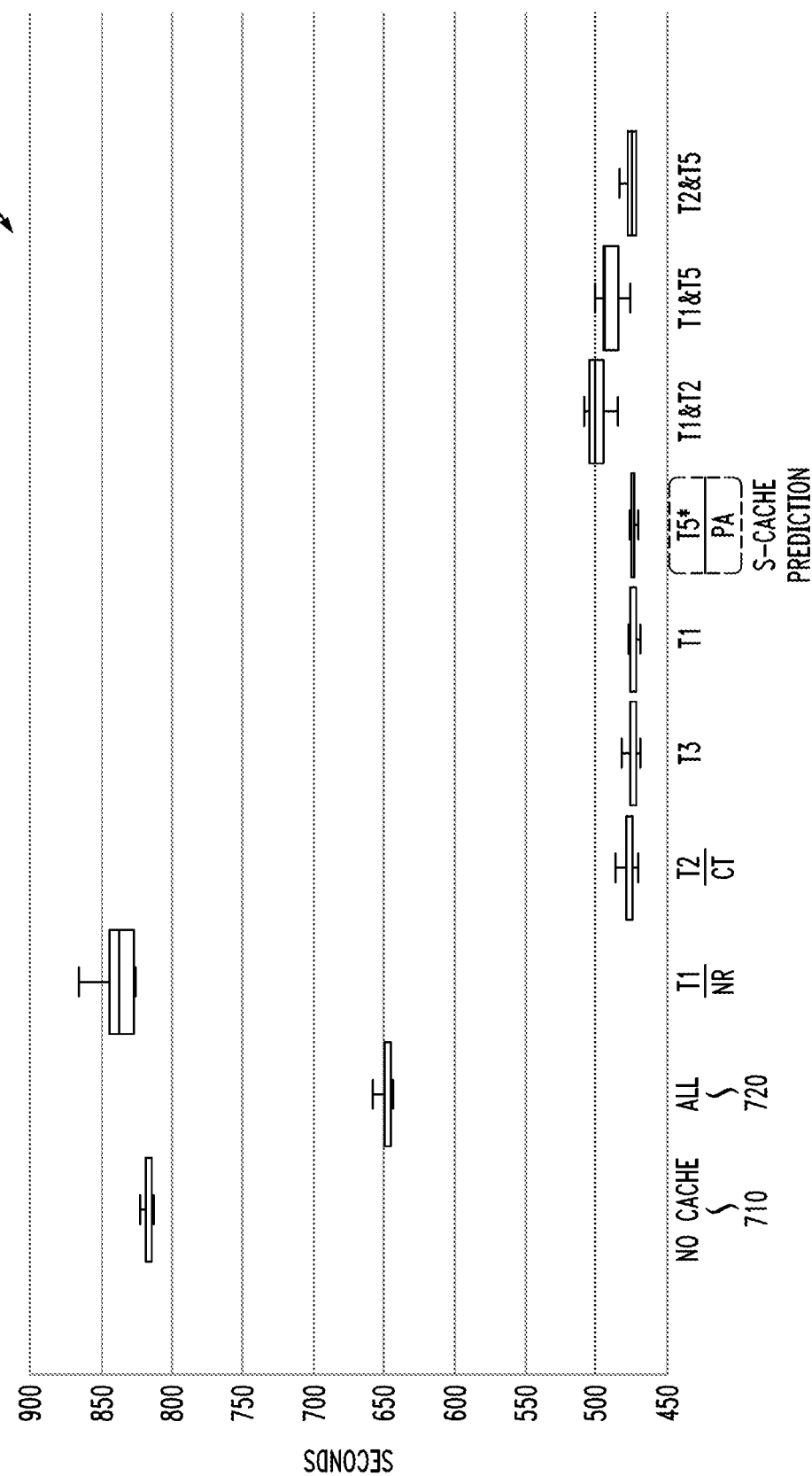

FIG. 7 illustrates boxplots 700 of the execution times (y-axis) of each cache decision (x-axis) (e.g., indicated by intuitive caching criteria). The 'No cache' decision 710 corresponds to the dataflow as-is. The 'No cache' decision 710 resulted in an average execution time of 815.66 seconds. The 'All' decision 720 corresponds to the strawman approach of caching each transformation with multiple references. The 'All' decision 720 results in an average execution time of 646.80 seconds. The 'All' cache decision 720 in this test scenario is only considered to illustrate that (as expected) caching all datasets does not reduce the execution time significantly when comparing to other caching decisions, which is explained by the overhead incurred by the cache transformations offsetting the initial gains, and the diminishing returns of adding more and more caches. Furthermore, in order to cache all transformations, more memory has to be set aside from the computation and dedicated for caching.

In addition, FIG. 7 represents the execution times of cache decisions highlighting the decisions for transformations T1, T2 and T5, indicated by the criteria NR (the number of references to that transformation), CT (the execution cost of the transformation), and PA (the proximity of the transformation to actions), respectively. The best average decision is a caching of transformation T5 (denoted by an asterisk), selected by the exemplary S-CACHE process 300 (denoted by a gray dashed square).

Now, consider the order of execution of the actions in the dataflow. The transformation T5 is used by the Actions A2 and A3, so when action A3 ends it will no longer be necessary and will be occupying memory that could be used in the execution of action A4. One way to solve the problem is rearranging the order of execution of actions or freeing cache memory after the action A3.

Figure 8:
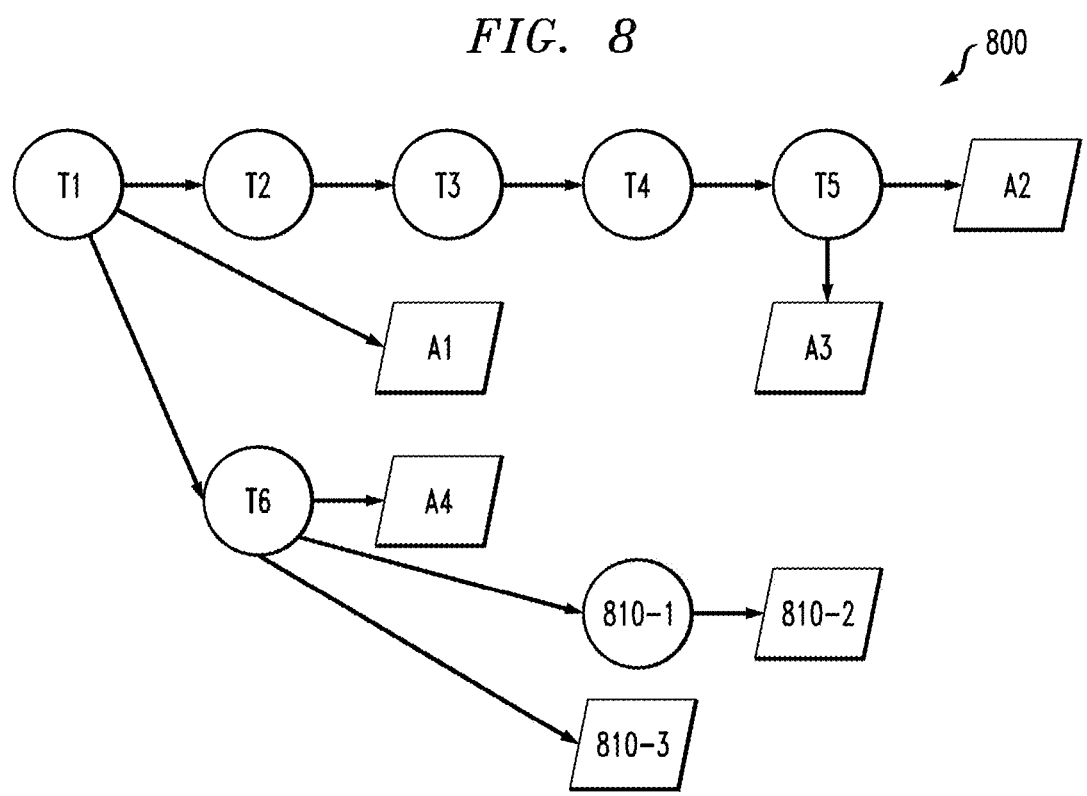

FIG. 8 illustrates an updated Constellation Query dataflow 800, based on the exemplary Constellation Query dataflow 400 of FIG. 4, now with additional actions 810-1 through 810-3. Thus, in addition to the metrics generated through the transformation T6, new metrics are generated that cause the workflow to become more complex.

In the example of FIG. 8, the transformation T5 might still be the substantially best option for caching, due to the number of transformations that stop being executed if transformation T5 is persisted in memory. However, as indicated above, after action A3 is executed this transformation T5 becomes unnecessary and transformation T6 could be a new better option. It would be enough to free the T5 transformation from memory and to initialize the exemplary S-CACHE process 300 of FIG. 3 again with what has not yet been executed from the new dataflow 800 and the respective costs to have a new caching strategy.

These types of decisions can contribute to a better use of physical memory and at the same time continue to reduce the costs of the dataflows that are executed.

Dynamic Cache Placement with Action Execution Ordering

In one or more embodiments, the dynamic placement techniques described in U.S. patent application Ser. No. 16/040,761, incorporated by reference above, take advantage of provenance data that becomes available as the workflow state information is updated during execution of operations to improve caching. As the workflow is executed, real-time information is gathered as provenance data and the initial workflow view is modified by the completion of actions. Thus, the cost model and the workflow view can be updated with this information gathered in real-time. The updated cost model and workflow states to compute are leveraged into a new cache placement strategy, potentially allowing for the eviction from memory of cached datasets that become unnecessary.

As noted above, one or more embodiments of the present disclosure provide for the online re-computation of a substantially optimal cache placement using an action execution ordering.

FIG. 9 illustrates exemplary pseudo code for an online cache placement dataflow execution process 900 with action execution ordering (also referred to as OAEX-CACHE), according to one embodiment of the disclosure. In the following description of the online cache placement dataflow execution process 900 with action execution ordering, an implementation is assumed of an algorithm for the automatic cache placement similar to the S-CACHE process 300 of FIG. 3, where the inputs are the dataflow submitted for execution, a cost model, the infrastructure and the input dataset; and the produced outputs are: a cache placement strategy and the expected gain (reduction in execution cost), obtained from the application of that strategy.

Any algorithm that is capable of determining a substantially optimal cache placement strategy from a dataset, a cost model and a definition of the dataflow as a DAG can be used instead of the S-CACHE, however, as would be apparent to a person of ordinary skill in the art. action execution ordering It is noted that the online cache placement dataflow execution process 900 with action execution ordering of FIG. 9 differs from the S-CACHE process 300 of FIG. 3 in that the latter returns a cache strategy (and its expected benefit), while the former actually executes the dataflow dynamically changing the cache strategy.

In one or more embodiments, the exemplary online cache placement dataflow execution process 900 considers essentially all operations in the dataflow as potential evaluation units, thereby configuring the online aspect of the present disclosure. The next action to be evaluated is defined by the online cache placement dataflow execution process 900, so as to substantially globally optimize the execution, taking into account the possible un-caching operations. Thus, the exemplary online cache placement dataflow execution process 900 executes the dataflow, while potentially changing the cache strategy, for example, after every operation, and not just after the evaluation of the complete lineages of actions as evaluation units. Further, the disclosed online cache placement dataflow execution process 900 also chooses an action execution ordering (e.g., selecting a next action for execution, for example, based on a policy).

As shown in FIG. 9, the exemplary online cache placement dataflow execution process 900 with action execution ordering works as follows, in at least one embodiment. An initial cache plan and corresponding estimate gain are computed leveraging an algorithm such as the S-CACHE process 300. This cache plan is applied to the dataflow w.

The actions of the dataflow are collected by the exemplary online cache placement dataflow execution process 900 in a list A and one of these actions is elected to be the next action to be executed. An implementation of the evaluation ordering algorithm could potentially consider look-aheads in the cache placement strategy. Automated planning techniques (see, e.g., M. Ghallab et al., Automated Planning Theory and Practice, Elsevier, 2004) and reinforcement learning techniques (R. S. Sutton and A. G. Barto, Reinforcement Learning: an Introduction, Cambridge: MIT Press, 1998) could be optionally used to consider possible action-chains that minimize the execution cost considering future changes in the cache placement.

In the following examples, a function is assumed that implements the following policy of selection: "select the action closest to one of the least referenced cached operations." This policy has the desirable property of ensuring that an action that "frees" a cached dataset is always elected, if there is one. Furthermore, an implementation of selection is assumed that returns nil when no actions remain in A. This signals the end of the main loop of the online cache placement dataflow execution process 900 of FIG. 9.

The main loop of the exemplary online cache placement dataflow execution process 900 comprises two stages. The first stage is itself a loop, in which the operations in the lineage of the elected action are executed. The second stage comprises the update of the dataflow followed by the selection of a next action to evaluate.

In the operation execution loop (e.g., the first stage of the main loop), an operation o is executed and the Trace of that execution is collected. The Trace comprises the provenance data and the execution time of that execution, captured through any kind of monitoring mechanism. See, for example, U.S. patent application Ser. No. 16/040,774, entitled "Dataflow Execution Time Estimation for In-Memory Distributed Processing Framework," incorporated by reference herein in its entirety.

An error is then computed as a difference between the expected execution time for the operation and the one obtained in the Trace. Notice that in the description of the above algorithm, it is assumed that the Trace is obtained as the result, after the complete execution, of the operation. This does not configure a restriction of the disclosed method, however. Implementations of the disclosed method are possible in which the collection of the trace as well as the computation of the error happen in real-time, as would be apparent to those skilled in the art.

If the error in the execution of the operation is below a predefined acceptable threshold, the operation execution loop continues to the next operation.

However, when the error is greater than the threshold, the model is updated and the online cache placement dataflow execution process 900 checks for changes in the infrastructure or data that may account for the difference. In a real-time implementation, this process can optionally be triggered in parallel with the execution of the operation. In other words, as soon as a sufficient difference in the cost model is observed, the model can be updated to reflect that error. In any case, this is done through calls to auxiliary functions Update_Model, Eval_Infrastructure and Provenance_Datasets, respectively. Update_Model updates the cost model according to the observed error, that is, the resulting cost model m considers the costs observed in the execution of the Trace. Eval_Infrastructure updates the representation of the available infrastructure considering variations to the environment, if any. Provenance_Datasets updates the representation of the input datasets based on the updated dataflow and the original datasets.

Following these updates, the exemplary online cache placement dataflow execution process 900 computes an alternative cache plan, via S-CACHE or a similar algorithm, given the new cost model. If this alternative plan is the same as the current best plan, this indicates that the current plan is resilient to that kind of error in the cost model of that operation. In order to reflect this, the threshold is updated in the exemplary embodiment to match this resiliency in the cost model.

If a different cache plan is generated as an alternative, the online cache placement dataflow execution process 900 computes the estimated cost of undoing the current cache plan and applying the alternative plan. This is done through a call to the Estimate auxiliary function that takes into account the costs of changing the deployed dataflow to match the new caches, that of evicting cached memory, if necessary (i.e., freeing cached memory or erasing cache data from disk, if any), as well as garbage collection costs and any other relevant costs related to the change in the application in the cache plan.

This cost (change_cost) is then compared to the change in cache gain from the current applied plan to the alternative plan. If the cost is offset by that change, the alternative cache plan is effectively applied before the next operation in the current lineage is executed.

After all operations in the lineage of the current action are executed, the dataflow is updated to reflect that by removing the references to those operations. Then, if at least one cached operation is 'freed', that is, becomes un-referenced by any actions, a new cache plan is computed (again via S-CACHE of FIG. 3).

The current action is then removed from the list of available actions A and a new next action is selected in a process similar to that described above. Notice that in this embodiment of the online cache placement dataflow execution process 900, the action selection only happens after a complete lineage is executed, but possible embodiments exist where, upon any changes in the cache plan, a global strategy is recomputed.

Finally, notice that no return value is defined for the exemplary online cache placement dataflow execution process 900. While the updated cost model can be returned to be used in future executions, the long term update of the cost model is outside the scope of the present disclosure.

EXAMPLE

Consider the example updated dataflow 800 from FIG. 8 as the input argument w and assume appropriate values for the remaining arguments are provided. In this example, there will be 6 evaluation units to evaluate the cache decisions after each action. The execution stage will take place 6 times, and the cache re-evaluation stage will take place 5 times, for all actions but the last.

Figure 10A:
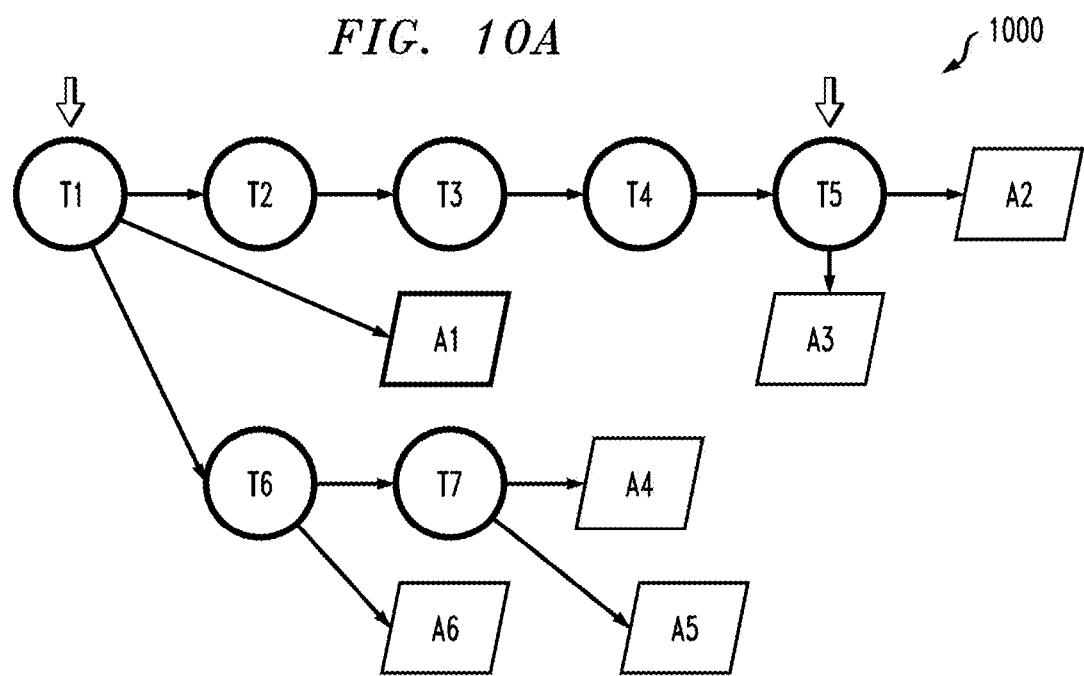
FIGS. 10A through 10F illustrate various cache placement strategies over time during execution of a dataflow, according to some embodiments of the disclosure.

FIGS. 10A through 10F illustrate various cache placement strategies over time during execution of a dataflow 1000, according to some embodiments of the disclosure. As shown in FIG. 10A, an initial execution of the exemplary S-CACHE process 300 of FIG. 3 yields as a substantially best initial cache plan the caching of transformations T1 and T5, as highlighted by the arrows in FIG. 10A. The list of actions A in FIG. 10A is A1, A2, A3, A4, A5, A6.

Figure 10B:
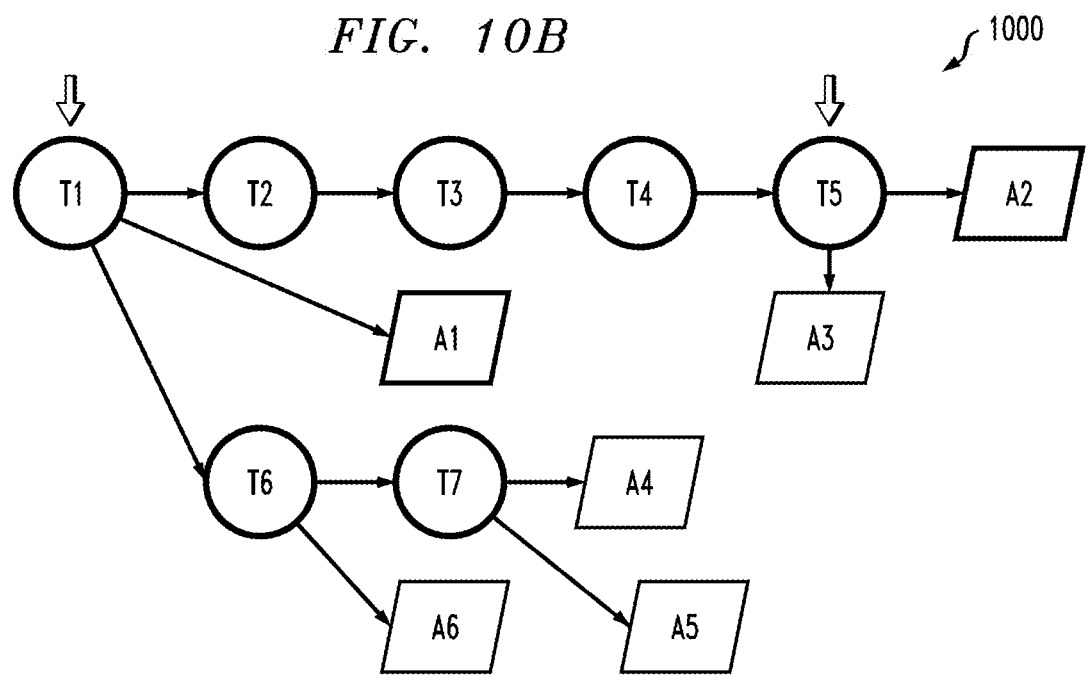

Assume an action selection that implements the following policy: "select the action closest to one of the least referenced cached operations." In the example of FIG. 10A, the least-referenced cached operation is T5 (with two references, A2 and A3), as the only other cached operation is T1 with 6 references (all six actions). Both actions A2 and A3 are closest to T5, so the policy chooses indistinctly among them. In the following examples, it is assumed that action A2 is selected, rather than the ordering of the actions as stated by the programmer (e.g., the first action executed would ordinarily be A1). The online cache placement dataflow execution process 900 thus enters the main loop with A2 selected as a, as shown in FIG. 10B, with operations T1 and T5 still cached.

Assume that in the execution of the first stage (the loop of executions of the operations in the lineage L of a) no errors between the cost model and the actual executions were considered significant. After updating the dataflow w by removing the references of L, there are no cached operations with zero references (T1 has five references (A1, A3, A4, A5 and A6) and T5 still has one reference (T3)).

Figure 10C:
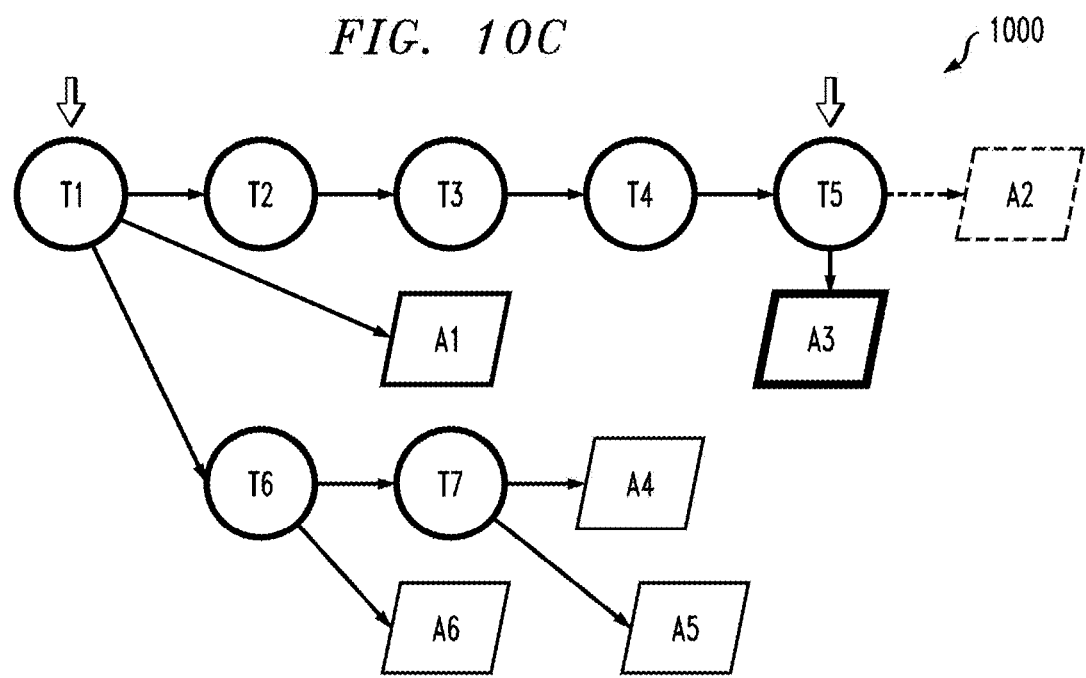

The first iteration of the main loop ends by selecting action A3, since it is the closest action to T5, the least-referenced cached operation, as shown in FIG. 10C, with references to the lineage of action A2 removed, action A3 is selected as the next action, and operations T1 and T5 are still cached.

Figure 10D:
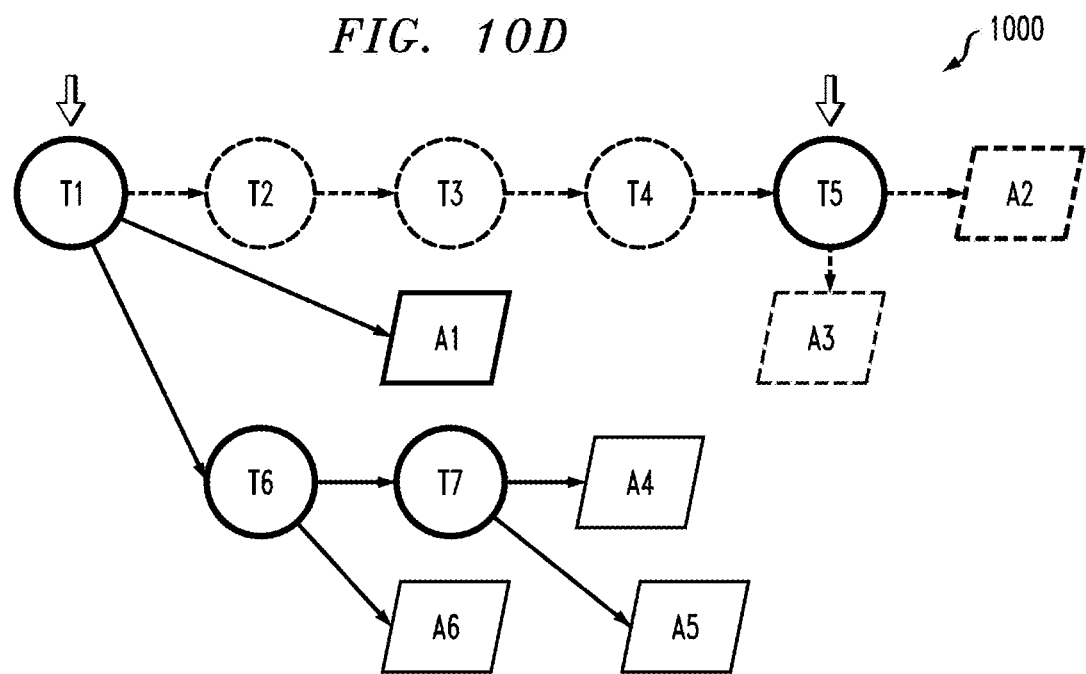

In a similar manner as the execution of the operations in the lineage of A2, it is also assumed that the execution of the operations in the lineage of A3 causes no changes to the model, dataflow or cache strategy. After the references to the lineage of A3 are removed from the dataflow w, the cached operation T5 has zero references, as shown in FIG. 10D, where the references to the lineages of A2 and A3 were removed, with operations T1 and T5 still cached (operation T5 is cached with zero references).

Figure 10E:
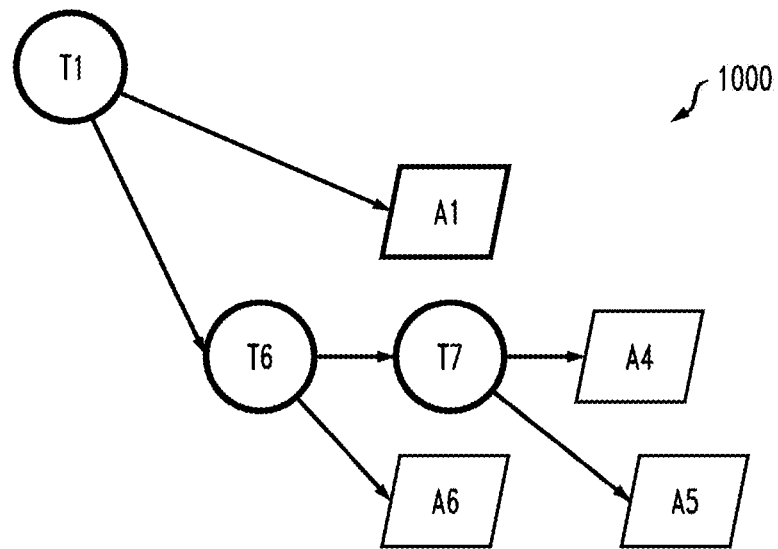

The exemplary embodiment of the online cache placement dataflow execution process 900 gives preference to the execution of actions that free cached datasets. Thus, the cache of T5 is now 'freed.' Thus, in this example, by the end of the second iteration of the main loop, the ex; online cache placement dataflow execution process 900 recomputes a plan for the caching of the remaining sub-dataflow of FIG. 10E. In FIG. 10E, the remaining dataflow after actions A2 and A3 have been executed. The uncaching of T5 triggers a recomputation of the cache plan over this sub-dataflow.

In the exemplary embodiment of the online cache placement dataflow execution process 900, the action selection happens after a complete lineage, but alternate embodiments exist where upon any changes in the cache plan, a global strategy recomputed, as would be apparent to a person of ordinary skill in the art.

In order to exemplify the online aspect of the cache placement, assume again the execution state represented by FIG. 10B. In the loop of the first stage, however, assume now that the execution of the lineage of T2 was much cheaper than predicted by the cost model. The model is then updated and checked for potential changes in the infrastructure or data that may account for the difference.

Figure 10F:
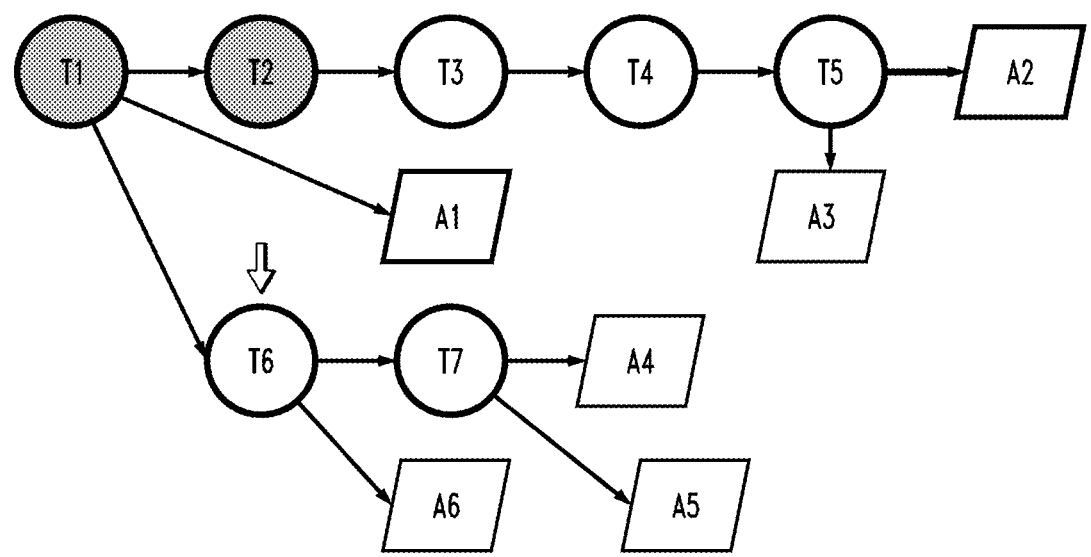

In any case, an alternative cache plan is computed via S-CACHE of FIG. 3. The alternative cache plan of caching only T6 is now considered better than the current plan of caching T1 and T5, as shown by FIG. 10F.

The exemplary online cache placement dataflow execution process 900 now computes the estimated cost of undoing the cache of T1 (which is not necessary in the alternative cache plan), of evicting memory, of garbage collection and of all other relevant costs for the adaptation of the cache placement. If this cost is offset by the change in gain from the current applied cache plan (T1 and T5) to the alternative plan, the alternative cache plan is applied before the next operation in the current lineage is executed.

In one or more embodiments, the present disclosure provides a computational approach to automatically revise, in a dynamic fashion, a cache placement strategy for an efficient execution of a given complex dataflow.

One or more embodiments of the disclosure provide improved methods, apparatus and computer program products for in-memory dataflow execution with dynamic placement of cache operations. The foregoing applications and associated embodiments should be considered as illustrative only, and numerous other embodiments can be configured using the techniques disclosed herein, in a wide variety of different applications.

It should also be understood that the disclosed dynamic cache placement techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for in-memory dataflow execution with dynamic placement of cache operations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based dynamic cache placement engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based dynamic cache placement platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
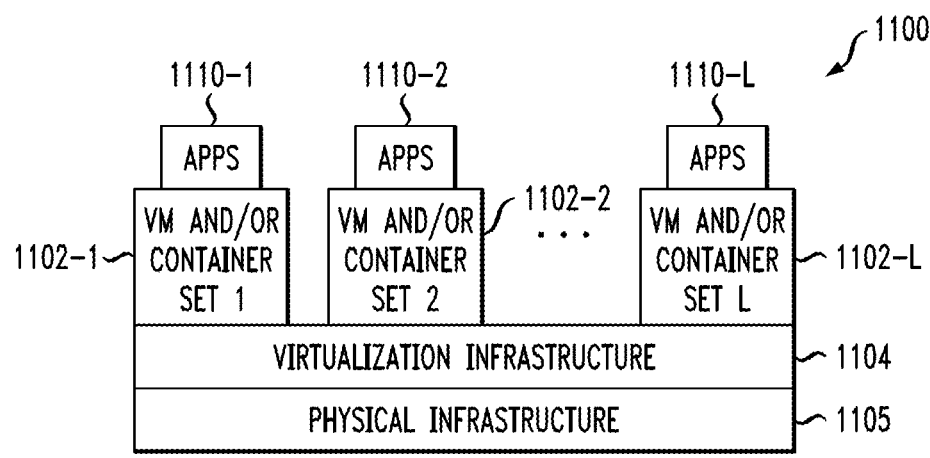
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the in-memory dataflow execution environment 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide dynamic cache placement functionality of the type described above for one or more processes running on a given one of the VMs. For example, each of the VMs can implement dynamic cache placement control logic and associated dynamic cache placement functionality for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide dynamic cache placement functionality of the type described above for one or more processes running on different ones of the containers. For example, a container host device supporting multiple containers of one or more container sets can implement one or more instances of dynamic cache placement control logic and associated functionality for use in generating a cache placement plan during execution of a dataflow.

As is apparent from the above, one or more of the processing modules or other components of the exemplary in-memory dataflow execution environment 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
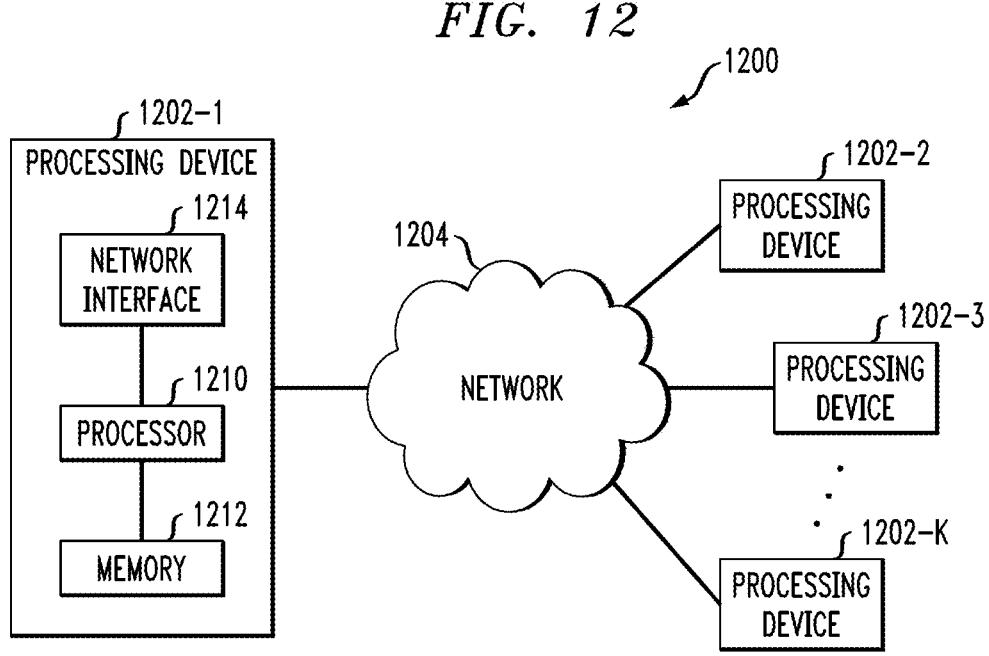
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising the steps of:
   obtaining a cost model for the execution of operations of a dataflow in a parallel processing framework with a given infrastructure and input dataset;
   obtaining a current cache placement plan for the dataflow, wherein the current cache placement plan comprises a combination of output datasets of a subset of the operations in the dataflow to cache, using one or more cache operations in the dataflow, based on an estimated reduction in a total execution cost for the dataflow in conjunction with the current cache placement plan being implemented given an input dataset;
   obtaining a current cache gain estimate for the current cache placement plan;
   selecting an action of the dataflow to execute from a plurality of remaining actions in the dataflow based on a predefined next action policy that selects the next action of the dataflow to execute from the plurality of remaining actions in the dataflow;
   executing one or more operations in a lineage of the selected action of the dataflow;
   determining, using at least one processing device, an alternative cache placement plan for the dataflow following the execution in conjunction with a predefined new plan determination criteria being satisfied, wherein the alternative cache placement plan comprises an alternative combination of output datasets of a second subset of the operations in the dataflow to cache, using one or more alternative cache operations in the dataflow, relative to the current cache placement plan;
   obtaining an alternative cache gain estimate for the alternative cache placement plan;
   implementing, using the at least one processing device, the alternative cache placement plan in conjunction with the predefined new plan implementation criteria being satisfied; and
   selecting a next action of the dataflow to execute from a plurality of remaining actions in the dataflow based on the predefined next action policy.

2. The method of claim 1, wherein the new plan determination criteria comprises a difference between prior estimates of an execution time of the one or more executed operations obtained from the cost model and an actual execution time of the one or more executed operations exceeding a predefined error threshold.

3. The method of claim 2, further comprising the step of updating the cost model for the one or more executed operations based on the difference.

4. The method of claim 3, further comprising the step of updating the predefined error threshold in conjunction with the current cache placement plan being substantially the same as the alternative cache placement plan.

5. The method of claim 3, wherein the executing the one or more operations in the lineage further comprises the step of updating a representation of an available computational infrastructure considering variations to an execution environment to account for the difference.

6. The method of claim 3, wherein the executing the one or more operations in the lineage further comprises the step of updating a representation of the input dataset following the executing to account for the difference.

7. The method of claim 1, wherein the predefined new plan implementation criteria comprises a difference between the alternative cache gain estimate and the current cache gain estimate exceeding a predefined threshold.

8. The method of claim 1, further comprising the steps of removing one or more of the cached datasets from memory based on a number of references to the operations that generated the cached datasets following an updating of the number of references and determining a new alternative cache placement plan for the dataflow following the removing.

9. The method of claim 1, wherein the plurality of operations comprises a plurality of lazy-evaluated data transformations and a plurality of data actions that enact the lazy-evaluated data transformations.

10. The method of claim 1, wherein the executing the one or more operations in the lineage of the selected action further comprises the steps of, following an execution of each given one of the one or more operations in the lineage:
    determining a new alternative cache placement plan for the dataflow following the execution of the given operation;
    implementing the new alternative cache placement plan in conjunction with a difference between the current cache gain and the new alternate cache gain for the new alternative cache placement plan exceeding a predefined change cost threshold; and
    updating the current cache gain with the new alternative cache placement plan in conjunction with the new alternative cache placement plan being implemented.

11. The method of claim 1, wherein the predefined next action policy selects the next action of the dataflow to execute from the plurality of remaining actions in the dataflow one or more of: (a) having a substantially least number of referenced cached operations and (b) substantially minimizing the total execution cost of the dataflow considering future changes in the current cache placement plan.

12. A computer program product, comprising a tangible machine-readable storage medium having encoded therein executable code of one or more software programs, wherein the one or more software programs when executed by at least one processing device perform the following steps:

obtaining a cost model for the execution of operations of a dataflow in a parallel processing framework with a given infrastructure and input dataset;

obtaining a current cache placement plan for the dataflow, wherein the current cache placement plan comprises a combination of output datasets of a subset of the operations in the dataflow to cache, using one or more cache operations in the dataflow, based on an estimated reduction in a total execution cost for the dataflow in conjunction with the current cache placement plan being implemented given an input dataset;

obtaining a current cache gain estimate for the current cache placement plan;

selecting an action of the dataflow to execute from a plurality of remaining actions in the dataflow based on a predefined next action next action policy that selects the next action of the dataflow to execute from the plurality of remaining actions in the dataflow;

executing one or more operations in a lineage of the selected action of the dataflow;

determining an alternative cache placement plan for the dataflow following the execution in conjunction with a predefined new plan determination criteria being satisfied, wherein the alternative cache placement plan comprises an alternative combination of output datasets of a second subset of the operations in the dataflow to cache, using one or more alternative cache operations in the dataflow, relative to the current cache placement plan;

obtaining an alternative cache gain estimate for the alternative cache placement plan;

implementing, using the at least one processing device, the alternative cache placement plan in conjunction with the predefined new plan implementation criteria being satisfied; and selecting a next action of the dataflow to execute from a plurality of remaining actions in the dataflow based on the predefined next action policy.

13. The computer program product of claim 12, wherein the new plan determination criteria comprises a difference between prior estimates of an execution time of the one or more executed operations obtained from the cost model and an actual execution time of the one or more executed operations exceeding a predefined error threshold and the predefined new plan implementation criteria comprises a difference between the alternative cache gain estimate and the current cache gain estimate exceeding a predefined threshold.

14. The computer program product of claim 12, further comprising the steps of removing one or more of the cached datasets from memory based on a number of references to the operations that generated the cached datasets following an updating of the number of references and determining a new alternative cache placement plan for the dataflow following the removing.

15. The computer program product of claim 12, wherein the predefined next action policy selects the next action of the dataflow to execute from the plurality of remaining actions in the dataflow one or more of: (a) having a substantially least number of referenced cached operations and (b) substantially minimizing the total execution cost of the dataflow considering future changes in the current cache placement plan.

16. A system, comprising:
a memory; and
at least one processing device, coupled to the memory, operative to implement the following steps:

obtaining a cost model for the execution of operations of a dataflow in a parallel processing framework with a given infrastructure and input dataset;

obtaining a cost model for the execution of operations of a dataflow in a parallel processing framework with a given infrastructure and input dataset;

obtaining a current cache placement plan for the dataflow, wherein the current cache placement plan comprises a combination of output datasets of a subset of the operations in the dataflow to cache, using one or more cache operations in the dataflow, based on an estimated reduction in a total execution cost for the dataflow in conjunction with the current cache placement plan being implemented given an input dataset;

obtaining a current cache gain estimate for the current cache placement plan;

selecting an action of the dataflow to execute from a plurality of remaining actions in the dataflow based on a predefined next action next action policy that selects the next action of the dataflow to execute from the plurality of remaining actions in the dataflow;

executing one or more operations in a lineage of the selected action of the dataflow;

determining an alternative cache placement plan for the dataflow following the execution in conjunction with a predefined new plan determination criteria being satisfied, wherein the alternative cache placement plan comprises an alternative combination of output datasets of a second subset of the operations in the dataflow to cache, using one or more alternative cache operations in the dataflow, relative to the current cache placement plan;

obtaining an alternative cache gain estimate for the alternative cache placement plan;

implementing, using the at least one processing device, the alternative cache placement plan in conjunction with the predefined new plan implementation criteria being satisfied; and selecting a next action of the dataflow to execute from a plurality of remaining actions in the dataflow based on the predefined next action policy.

17. The system of claim 16, wherein the new plan determination criteria comprises a difference between prior estimates of an execution time of the one or more executed operations obtained from the cost model and an actual execution time of the one or more executed operations exceeding a predefined error threshold and the predefined new plan implementation criteria comprises a difference between the alternative cache gain estimate and the current cache gain estimate exceeding a predefined threshold.

18. The system of claim 16, further comprising the steps of removing one or more of the cached datasets from memory based on a number of references to the operations that generated the cached datasets following an updating of the number of references and determining a new alternative cache placement plan for the dataflow following the removing.

19. The system of claim 16, further comprising the steps of removing one or more of the cached datasets from memory based on a number of references to the operations that generated the cached datasets following an updating of the number of references and determining a new alternative cache placement plan for the dataflow following the removing.

20. The system of claim 16, wherein the predefined next action policy selects the next action of the dataflow to execute from the plurality of remaining actions in the dataflow one or more of: (a) having a substantially least number of referenced cached operations and (b) substantially minimizing the total execution cost of the dataflow considering future changes in the current cache placement plan.

* * * * *